United States Patent
Cho et al.

(10) Patent No.: US 9,755,195 B2
(45) Date of Patent: Sep. 5, 2017

(54) APPARATUS AND METHOD FOR SEALING POUCH CASE OF SECONDARY BATTERY

(71) Applicant: LG Chem, Ltd., Seoul (KR)

(72) Inventors: Seung-Su Cho, Daejeon (KR);
Seung-Don Choi, Daejeon (KR);
Dae-Sik Choi, Daejeon (KR);
Hong-Sin Kim, Daejeon (KR)

(73) Assignee: LG Chem, Ltd. (KR)

( * ) Notice: Subject to any disclaimer, the term of this patent is extended or adjusted under 35 U.S.C. 154(b) by 352 days.

(21) Appl. No.: 14/489,000

(22) Filed: Sep. 17, 2014

(65) Prior Publication Data

US 2015/0000117 A1 Jan. 1, 2015

Related U.S. Application Data

(63) Continuation of application No. PCT/KR2013/012347, filed on Dec. 27, 2013.

(30) Foreign Application Priority Data

Dec. 28, 2012 (KR) .................. 10-2012-0156106
Dec. 27, 2013 (KR) .................. 10-2013-0165525

(51) Int. Cl.
*B32B 37/00* (2006.01)
*H01M 2/02* (2006.01)
(Continued)

(52) U.S. Cl.
CPC ........... *H01M 2/02* (2013.01); *H01M 2/0207* (2013.01); *H01M 2/0267* (2013.01);
(Continued)

(58) Field of Classification Search
CPC .... H01M 2/02; H01M 2/0207; H01M 2/0267; H01M 10/0436; H01H 10/0404; B29C 66/814; B30B 15/06
(Continued)

(56) References Cited

U.S. PATENT DOCUMENTS 4,374,697 A * 2/1983 Tsuzuki .................. B29C 65/08
156/580.2
4,403,465 A * 9/1983 Bachner .................. B29C 65/02
156/580.2
(Continued)

FOREIGN PATENT DOCUMENTS

JP 2004-087239 A 3/2004
JP 2004103409 A 4/2004
(Continued)

OTHER PUBLICATIONS

International Search Report for PCT/KR2013/012347 dated Apr. 28, 2014.

*Primary Examiner* — James Sells
(74) *Attorney, Agent, or Firm* — Lerner, David, Littenberg, Krumholz & Mentlik, LLP

(57) ABSTRACT

The present disclosure discloses an apparatus and method for sealing a pouch case that optimizes a sealing shape or structure of a sealing portion at an inner side of the pouch case to ensure insulation of a secondary battery. The apparatus for sealing a pouch case of a pouch-type secondary battery according to the present disclosure includes an upper compression jig to apply pressure to a sealing portion of the pouch case in a downward direction, and a lower compression jig to apply pressure to the sealing portion of the pouch case in an upward direction, and at least one of the upper compression jig and the lower compression jig applies the pressure to the pouch case at different depths at an inner side end and an outer side end.

11 Claims, 10 Drawing Sheets

(51) Int. Cl.
*H01M 10/04* (2006.01)
*H01M 10/0587* (2010.01)

(52) U.S. Cl.
CPC ... *H01M 10/0404* (2013.01); *H01M 10/0436* (2013.01); *H01M 2/0212* (2013.01); *H01M 10/0587* (2013.01); *Y10T 29/4911* (2015.01); *Y10T 29/53135* (2015.01)

(58) Field of Classification Search
USPC ..................................... 156/580, 581, 583.1
See application file for complete search history.

(56) References Cited

U.S. PATENT DOCUMENTS

| | | | |
|---|---|---|---|
| 6,571,850 B2* | 6/2003 | Melheim | B29C 66/8163 100/258 A |
| 7,581,298 B2* | 9/2009 | Krahl | B29C 65/18 156/581 |
| 2006/0093905 A1 | 5/2006 | Kim | |
| 2011/0086259 A1 | 4/2011 | Kim et al. | |
| 2011/0091766 A1 | 4/2011 | Kim | |
| 2011/0135997 A1 | 6/2011 | Watanabe et al. | |

FOREIGN PATENT DOCUMENTS

| | | |
|---|---|---|
| JP | 2005129344 A | 5/2005 |
| JP | 2006-040747 A | 2/2006 |
| JP | 2011-192603 A | 9/2011 |
| JP | 2012527724 A | 11/2012 |
| KR | 20110041071 A | 4/2011 |
| KR | 20110049864 A | 5/2011 |

* cited by examiner (a)

(b)

APPARATUS AND METHOD FOR SEALING POUCH CASE OF SECONDARY BATTERY

CROSS-REFERENCE TO RELATED APPLICATION

This application is a continuation of International Application No. PCT/KR2013/012347 filed on Dec. 27, 2013, which claims priority under 35 USC 119(a) to Korean Patent Application No. 10-2012-0156106 filed in the Republic of Korea on Dec. 28, 2012 and Korean Patent Application No. 10-2013-0165525 filed in the Republic of Korea on Dec. 27, 2013, the disclosures of which are incorporated herein by reference.

TECHNICAL FIELD

The present disclosure relates to an apparatus and method for sealing a pouch case of a pouch-type secondary battery, and more particularly, to an apparatus and method for sealing a pouch case of a pouch-type secondary battery that may improve the insulation of the pouch-type secondary battery by enhancing a sealing process being performed on the pouch case in the manufacture of the pouch-type secondary battery.

BACKGROUND ART

Due to its characteristics of being easily applicable to various products and electrical characteristics such as a high energy density, a secondary battery is not only commonly applied to a portable equipment, but universally applied to an electric vehicle (EV), a hybrid vehicle (HV), or an energy storage system that is propelled by an electric motor.

This secondary battery is gaining attention for its primary advantages of remarkably reducing the use of fossil fuels and not generating by-products from the use of energy, making it a new eco-friendly and energy efficient source of energy.

FIG. 1 is an exploded perspective view schematically illustrating a configuration of a pouch-type secondary battery according to a related art. Referring to FIG. 1, the conventional pouch-type secondary battery 1 includes an electrode assembly 10 and a pouch case 20 as a basic structure.

Here, the electrode assembly 10 includes a cathode plate, an anode plate, and a separator interposed between the cathode plate and the anode plate to electrically isolate the cathode plate from the anode plate, and the electrode assembly 10 is equipped with a cathode tab extending from the cathode plate and an anode tab extending from the anode plate.

The cathode tab and the anode tab may be coupled to a cathode lead 11 and an anode lead 12 by a resistance welding method, a ultrasonic welding method, or a laser welding method, and the electrode lead is exposed through the pouch case to perform a function of electrically connecting the secondary battery to an external application device as an electrode of the secondary battery.

The electrode assembly 10 is introduced in the pouch case 20 together with an electrolyte solution.

The pouch case 20 may be classified into an upper case 21 and a lower case 22, and may be called a single cap or a double cap based on a location of a part in which the electrode assembly 10 is received.

The pouch case 20 has an aluminum thin film interposed therein to protect the electrolyte solution and the electrode assembly 10 disposed inside as well as to complement the electrochemical properties of a battery cell and improve heat resistance. In this instance, to ensure insulation of a battery cell from an external environment, the aluminum thin film may have, on an outer surface, an insulation layer coated with an insulation material, for example, polyethylene terephthalate (PET) resin or nylon resin.

During a sealing process, the pouch case 20 may be joined or adhered along its outer periphery by heat fusion. To do so, an adhesive layer of casted polypropylene (CPP) or polypropylene (PP) is formed on a lower surface of the upper case 21 and an upper surface of the lower case 22 to achieve adhesion therebetween. In addition to adhesion of the pouch case 20, the adhesive layer also serves as an insulation layer to prevent conduction between the aluminum layer and the electrolyte injected into the pouch case 20.

FIG. 2 is an enlarged cross-sectional view of sections A and B of FIG. 1. Referring to FIG. 2, the upper case 21 has a predetermined layered structure of an insulation layer 25, an aluminum layer 24, and an adhesive layer 23 in a sequential order, and the lower case 22 has a structure of an adhesive layer 23, an aluminum layer 24, and an insulation layer 25.

To seal the pouch case 20, heat and pressure may be provided to the lower adhesive layer 23 of the upper case 21 and the upper adhesive layer 23 of the lower case 22.

FIG. 3 is an enlarged cross-sectional view illustrating a state in which the aluminum layer is exposed to the electrolyte due to imprecise sealing of the sealing portion when sealing the pouch case according to the related art. Referring to FIG. 3, when erroneous sealing occurs at the sealing portion of the pouch case 20 as represented by C, the adhesive layer 23 may have a reduced thickness at the inner side of the sealing portion where the electrode assembly 10 is placed. If the adhesive layer 23 formed at the inner side of the sealing portion is not thick, a portion of the aluminum layer 24 may be exposed to the electrolyte as indicated by D.

This may occur when the adhesive layer 23 of the sealing portion is forced to move in a side direction, particularly, in an outer side direction of the secondary battery, by the pressure during the sealing process of the pouch case 20. Also, in this case, dielectric breakdown occurs to the secondary battery, causing serious safety problems such as combustion, explosion or fire due to an internal short circuit, as well as damage to the secondary battery.

DISCLOSURE

Technical Problem

The present disclosure is designed to solve the above problems, and therefore, the present disclosure is directed to providing a method and apparatus for sealing a pouch case that may stably ensure insulation of a sealing portion when sealing a pouch-type secondary battery.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Technical Solution

To achieve the above object, an apparatus for sealing a pouch case of a pouch-type secondary battery according to one aspect of the present disclosure includes an upper compression jig to apply pressure to the sealing portion of the pouch case in a downward direction, and a lower compression jig to apply pressure to the sealing portion of the pouch case in an upward direction, wherein at least one of the upper compression jig and the lower compression jig applies the pressure to the pouch case at different depths at an inner side end and an outer side end.

Preferably, at least one of the upper compression jig and the lower compression jig tilts in contact with the pouch case.

More preferably, the tilting is performed in a manner of applying a higher pressure to the pouch case at an outside end of at least one of the upper compression jig and the lower compression jig.

Also, preferably, at least one of the upper compression jig and the lower compression jig has a step formed on a pressure applying surface onto the pouch case.

More preferably, the step is formed higher at an outer side end than an inner side end.

Also, preferably, a number of the steps is at least two.

Also, preferably, at least one of the upper compression jig and the lower compression jig has a slope over a pressure applying surface onto the pouch case.

More preferably, the slope is formed higher at an outer side end of at least one of the upper compression jig and the lower compression jig than at an inner side end.

Also, preferably, at least one of the upper compression jig and the lower compression jig applies heat to the sealing portion of the pouch case with the pressure.

Also, preferably, at least one of the upper compression jig and the lower compression jig preheats the sealing portion of the pouch case before applying the pressure.

To achieve the above object, an apparatus for manufacturing a secondary battery according to another aspect of the present disclosure includes the above apparatus for sealing the pouch case.

To achieve the above object, a method for sealing a pouch case of a pouch-type secondary battery according to still another aspect of the present disclosure includes receiving an electrode assembly in an internal space of the pouch case, and applying pressure to a sealing portion of the pouch case in upward and downward directions, wherein the applying of the pressure comprises applying the pressure to the pouch case at different depths.

Preferably, the applying of the pressure comprises applying the pressure at a greater depth at an outer side than at an inner side.

More preferably, the applying of the pressure comprises tiling at least one of the upper compression jig and the lower compression jig applying the pressure to the pouch case, in contact with the pouch case.

More preferably, the tilting is performed in a manner of applying a higher pressure to the pouch case at an outer side end of at least one of the upper compression jig and the lower compression jig.

Also, preferably, the applying of the pressure comprises applying heat to the sealing portion of the pouch case with the pressure.

Also, preferably, the method for sealing the pouch case of the pouch-type secondary battery further includes preheating the sealing portion of the pouch case before applying the pressure.

Advantageous Effects

According to the present disclosure, in a sealing process of a pouch case of a pouch-type secondary battery, a sealing shape of a sealing portion at an inner side may be optimized to ensure insulation of the secondary battery.

Particularly, according to the present disclosure, in the sealing process of the sealing portion of the pouch case, a thick insulation layer may be formed at the inner side of the sealing portion by forcing an adhesive layer at the inner side of the pouch case to move in an inner side direction of the secondary battery rather than in an outer side direction.

Accordingly, an aluminum layer of the pouch case may be prevented from being exposed during sealing of the sealing portion, so that conduction between an electrolyte and the aluminum layer may be prevented and the pouch case may maintain a more mechanically solid shape.

Therefore, according to this aspect of the present disclosure, insulation of the pouch case of the secondary battery may be stably ensured, and combustion, an explosion, or a fire caused by an internal short circuit may be effectively prevented.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Figure 1:
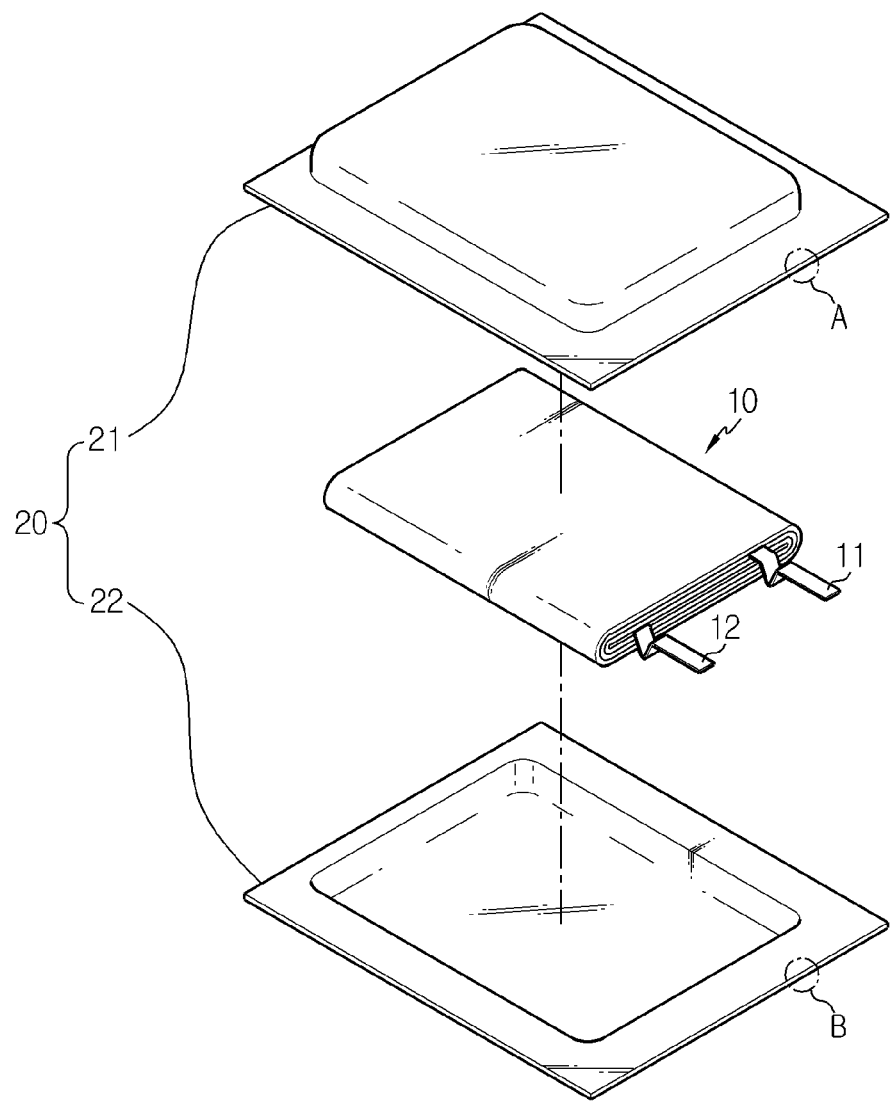
FIG. 1 is an exploded perspective view schematically illustrating a configuration of a pouch-type secondary battery according to a related art.
Figure 2:
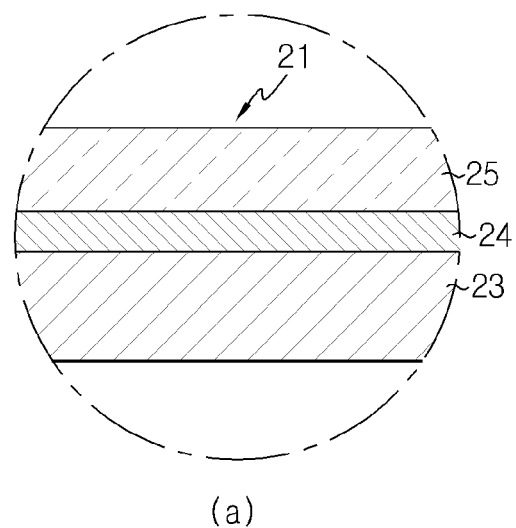
FIG. 2 is an enlarged cross-sectional view of sections A and B of FIG. 1.
Figure 2:
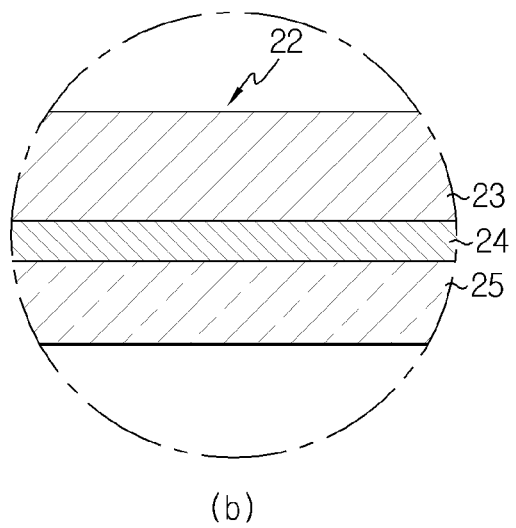
Figure 3:
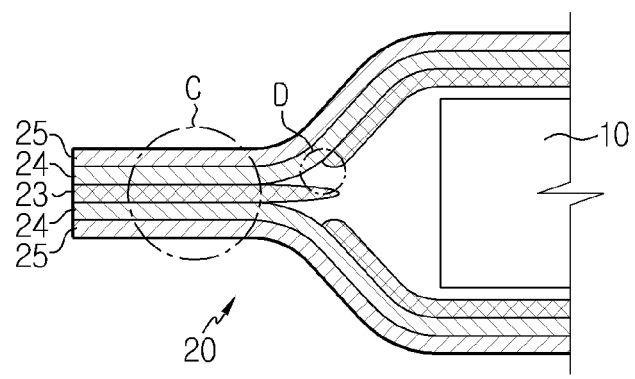
FIG. 3 is an enlarged cross-sectional view illustrating a state in which an aluminum layer is exposed to an electrolyte due to imprecise sealing of a sealing portion when sealing a pouch case according to a related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Also, in the description of the present disclosure, when it is deemed that a specific explanation of related well-known constructions or functions may obscure the essence of the invention, their detailed description is omitted. Rather, the exemplary embodiments are provided so that this disclosure will be thorough and complete, and will fully convey the scope to those skilled in the art. In the drawings, the relative size and depiction of elements may be exaggerated for clarity, illustration, and convenience.

Figure 4:
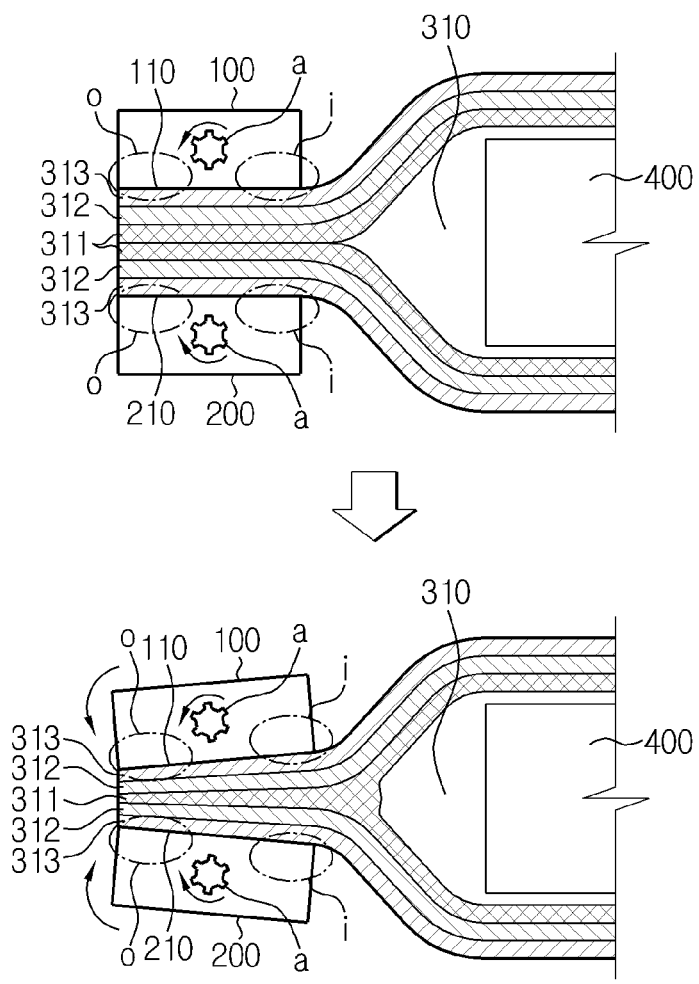
FIG. 4 is a diagram schematically illustrating a configuration of an apparatus for sealing a pouch case according to an exemplary embodiment of the present disclosure.

FIG. 4 is a diagram schematically illustrating a configuration of an apparatus for sealing a pouch case according to an exemplary embodiment of the present disclosure. Referring to FIG. 4, the sealing apparatus according to the present disclosure includes an upper compression jig 100 and a lower compression jig 200.

The upper compression jig 100 is disposed above a sealing portion of a pouch case 300 to apply pressure to the sealing portion in a downward direction.

The lower compression jig 200 is disposed below the sealing portion of the pouch case 300 to apply pressure to the sealing portion in an upward direction.

The upper compression jig 100 applies pressure to the sealing portion of the pouch case 300 in a downward direction and the lower compression jig 200 applies pressure to the sealing portion of the pouch case 300 in an upward direction, so that the sealing portion may be sealed by the pressure applied in the upward and downward directions.

Particularly, in the present disclosure, at least one of the upper compression jig 100 and the lower compression jig 200 applies pressure at different depths at an inner side end and an outer side end. Here, the outer side end represents a portion located at an outer side of the secondary battery (a left side in FIG. 4) among pressure applying surfaces 110 and 210 of the upper compression jig and the lower compression jig as indicated by 'o' in the drawing, and the inner side end represents a portion located at an inner side of the secondary battery (a right side in FIG. 4), that is, a portion located at the side where an electrode assembly 400 received in an internal space 310 of the pouch case is disposed, and is indicated by 'i' in the drawing. Here, the pressure applying surfaces 110 and 210 represent a part coming into contact with the sealing portion of the pouch case 300 when applying pressure by the upper compression jig 100 and the lower compression jig 200.

When the pressure applying depths at the inner side end (i) and the outer side end (o) differ, an inner side thickness of an adhesive layer 311 of the sealing portion may change. Particularly, when the pressure applying depth at the outer side end (o) is greater than the pressure applying depth at the inner side end (i), the adhesive layer 311 of the sealing portion is forced to move in an inner side direction so that the thicker adhesive layer 311 may be formed at the inner side of the sealing portion than at the outer side.

Preferably, to achieve the different pressure applying depths at the inner side end and the outer side end to the pouch case 300, at least one of the upper compression jig 100 and the lower compression jig 200 may be constructed to tilt while keeping in contact with the pouch case 300.

Referring to FIG. 4 again, after applying the pressure in the upward and downward directions, the upper compression jig 100 and the lower compression jig 200 may tilt while keeping in contact with the pouch case 300. When the upper compression jig 100 and the lower compression jig 200 tilt as described in the foregoing, the pressure applying depths at the inner side end (i) and the outer side end (o) of the upper compression jig 100 and the lower compression jig 200 to the pouch case 300 may differ. In this instance, preferably, the outer side portions of the upper compression jig 100 and the lower compression jig 200 may tilt at a higher angle relative to the horizontal plane than the inner side portions, as shown in FIG. 4. That is, preferably, the upper compression jig 100 tilts such that the outer side portion is lower than the inner side portion, and the lower compression jig 200 tilts such that the outer side portion is higher than the inner side portion. According to this embodiment, by the tilting of the upper compression jig 100 and the lower compression jig 200, higher pressure may be applied to the pouch case 300 at the outer side end (o) than at the inner side end (i). Accordingly, the adhesive layer 311 may be formed with a higher thickness at the inner side of the sealing portion than at the outer side.

Meanwhile, the tiling shown as an example in FIG. 4 depicts that just the upper compression jig 100 may tilt, and obviously, on the contrary, just the lower compression jig 200 may tilt.

On the other hand, for tilting, various rotation means may be provided to at least one of the upper compression jig 100 and the lower compression jig 200. For example, a rotation means may be implemented as a rotating shaft (a) and a motor (not shown), and may provide the compression jig with a rotational force to tilt the compression jig. That is, the motor may rotate the rotating shaft (a), and the compression jig may rotate along the rotating shaft (a) in an arrow direction indicated in FIG. 4. However, the rotation means equipped with the rotating shaft (a) and the motor is just an example, and the apparatus for sealing the pouch case according to the present disclosure is not limited by this exemplary rotation means.

Figure 5:
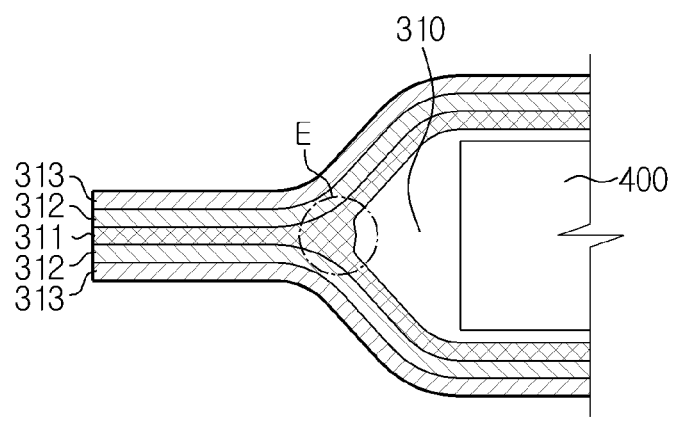
FIG. 5 is an enlarged cross-sectional view illustrating a state in which a pouch case is sealed according to the present disclosure.

An exemplary example of sealing by the apparatus for sealing the pouch case according to the present disclosure is illustrated in FIG. 5.

FIG. 5 is an enlarged cross-sectional view illustrating a state in which the pouch case is sealed according to the present disclosure. Referring to FIG. 5, when the pouch case 300 is sealed by the apparatus for sealing the pouch case according to the present disclosure, the adhesive layer 311 may be formed with an increased thickness at the inner side of the sealing portion as indicated by E. Accordingly, based on this aspect of the present disclosure, exposure of a portion of the aluminum layer 312 caused by the adhesive layer 311 formed with a reduced thickness at the inner side of the sealing portion and consequent conduction between the aluminum layer 312 and the electrolyte may be prevented. Therefore, according to the present disclosure, insulation of the pouch case 300 may be stably ensured.

Also, preferably, at least one of the upper compression jig 100 and the lower compression jig 200 may have a step on the pressure applying surfaces 110 and 210 onto the pouch case 300.

Figure 6:
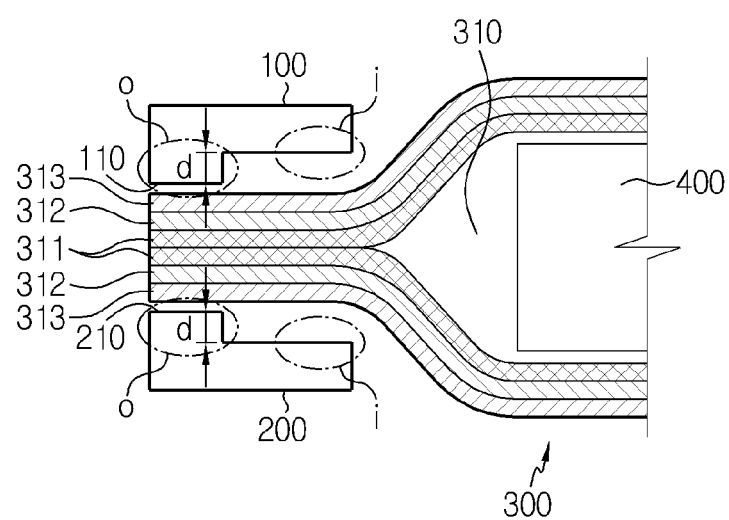
FIG. 6 is a diagram schematically illustrating a configuration of an apparatus for sealing a pouch case according to another exemplary embodiment of the present disclosure.

FIG. 6 is a diagram schematically illustrating a configuration of an apparatus for sealing a pouch case according to another exemplary embodiment of the present disclosure.

Referring to FIG. 6, steps are formed in the upper compression jig 100 and the lower compression jig 200. When the steps are formed in the upper compression jig 100 and the lower compression jig 200 as described in the foregoing, the pressure applying depths at the inner side end (i) and the outer side end (o) of the upper compression jig 100 and the lower compression jig 200 may differ. That is, when the stepped upper compression jig 100 and/or the stepped lower compression jig 200 apply pressure to the sealing portion of the pouch case 300 in upward and downward directions, a portion having a high step has a greater pressure applying depth than a portion having a low step. In this instance, the height (d) of the step may be from several μm up to a maximum of 10 mm.

More preferably, the step may be formed with a greater height at the outer side end (o) than the inner side end (i) as shown in FIG. 6. According to this embodiment, the adhesive layer 311 located at the outer side of the sealing portion is forced to move to the inner side of the sealing portion, so that the thick adhesive layer 311 may be formed at the inner side of the sealing portion.

Although FIG. 6 shows that the steps are formed respectively in both the upper compression jig 100 and the lower compression jig 200, this is just an example, and it is obvious that a step may be formed in only the upper compression jig 100 and a step may not be formed in the lower compression jig 200, or vice versa.

Meanwhile, it is not necessary for just one step to be formed at each of the pressure applying surfaces 110 and 210 of the upper compression jig and/or the lower compression jig, and at least two steps may be formed respectively.

Figure 7:
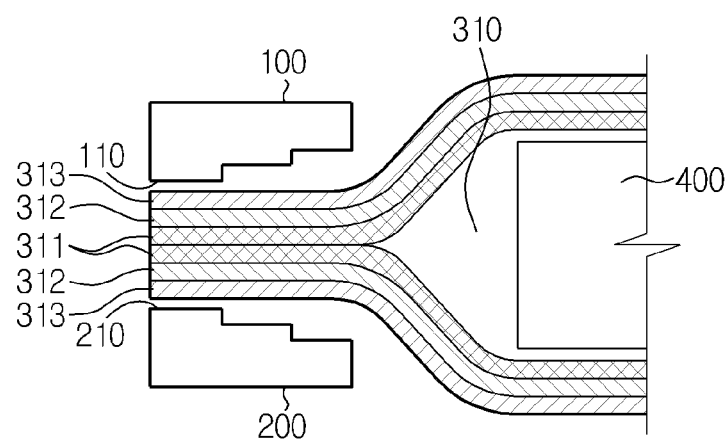
FIG. 7 is a diagram schematically illustrating a configuration of an apparatus for sealing a pouch case according to still another exemplary embodiment of the present disclosure.

FIG. 7 is a diagram schematically illustrating a configuration of an apparatus for sealing a pouch case according to still another exemplary embodiment of the present disclosure.

Referring to FIG. 7, two steps are formed for each of the upper compression jig 100 and the lower compression jig 200. According to this embodiment, the steps formed sequentially over the pressure applying surfaces 110 and 210 of the upper compression jig and the lower compression jig may definitely lead a direction, in which the adhesive layer 311 is forced to move, to an inner side direction of the secondary battery.

However, the present disclosure is not necessarily limited to this exemplary embodiment, and at least two steps may be formed in only one compression jig among the upper compression jig 100 and the lower compression jig 200. Also, the number of the steps formed in the upper compression jig 100 or the lower compression jig 200 may be at least three. Also, a step height and/or a width between steps for each step may be equal, and may differ according to necessity.

Meanwhile, although the embodiments of FIGS. 6 and 7 implement the different pressure applying depths at the inner side end and the outer side end to the pouch case 300 by forming the step in the upper compression jig 100 and/or the lower compression jig 200, the present disclosure is not necessarily limited in this regard.

For example, to implement the different pressure applying depths at the inner side end and the outer side end to the pouch case 300, at least one of the upper compression jig 100 and the lower compression jig 200 may have a slope over the pressure applying surfaces 110 and 210 onto the pouch case 300. This embodiment will be described with reference to FIG. 8.

Figure 8:
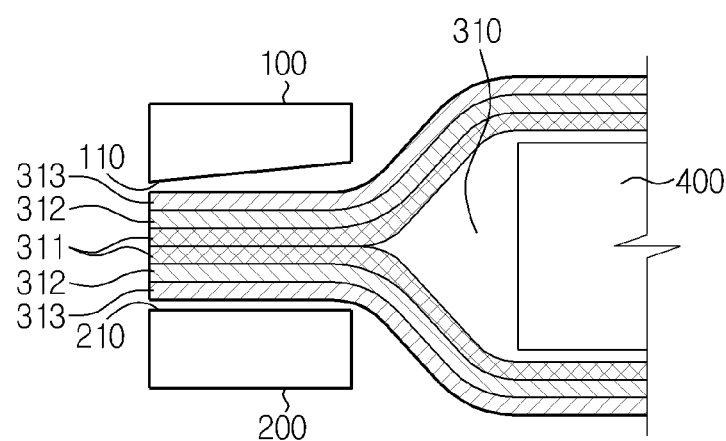
FIG. 8 is a diagram schematically illustrating a configuration of an apparatus for sealing a pouch case according to yet another exemplary embodiment of the present disclosure.

FIG. 8 is a diagram schematically illustrating a configuration of an apparatus for sealing a pouch case according to yet another exemplary embodiment of the present disclosure.

Referring to FIG. 8, the pressure applying surface 110 of the upper compression jig 100 has a slope. Particularly, the slope formed in the pressure applying surface 110 of the upper compression jig 100 may be preferably formed such that the outer side end (o) of the upper compression jig 100 is higher than the inner side end (i). According to this embodiment, the adhesive layer 311 of the sealing portion may be forced to move in the inner side direction more naturally, so that the thick adhesive layer 311 may be formed at the inner side of the sealing portion, and thereby the insulation reliability of the pouch case 300 may be ensured more stably.

However, this is just an example, and it is obvious that a slope may be formed in the lower compression jig 200 as well as the upper compression jig 100, and a slope may be formed in only the lower compression jig 200.

Figure 9:
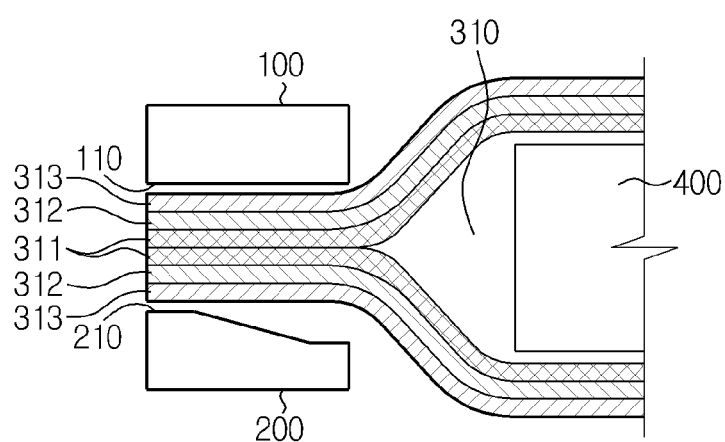
FIG. 9 is a diagram schematically illustrating a configuration of an apparatus for sealing a pouch case according to a further another exemplary embodiment of the present disclosure.

FIG. 9 is a diagram schematically illustrating a configuration of an apparatus for sealing a pouch case according to a further another exemplary embodiment of the present disclosure.

Referring to FIG. 9, the pressure applying surface 210 has a step in the pressure applying surface 210 of the lower compression jig 200, and a slope is formed over the step. According to this embodiment, a height difference over the step sequentially changes by the sloped surface on the step, so that the adhesive layer 311 of the sealing portion may be forced to move in the inner side direction favorably.

Also, preferably, the upper compression jig 100 and/or the lower compression jig 200 may apply heat to the sealing portion together with pressure. As described in the foregoing the heat applied to the sealing portion to seal the pouch case 300 may bring mobility for the adhesive layer 311 of the sealing portion, and this may force the adhesive layer 311 of the sealing portion to move easily when pressure is applied, so that the adhesive layer 311 may be formed with a greater thickness at the inner side of the sealing portion.

Also, preferably, the upper compression jig 100 and/or the lower compression jig 200 may preheat the sealing portion before applying the pressure. If the sealing portion is preheated before the pressure is applied, the adhesive layer 311 becomes melted sufficiently when the pressure is applied and thus the adhesive layer 311 is forced to move to the both sides at a proper rate when pressure is applied to the sealing portion in the upward and downward directions. When the adhesive layer 311 is forced to move to the both sides at a proper rate, the adhesive layer 311 is not forced to move out of the sealing portion more than necessary so that the adhesive layer 311 of the sealing portion may be formed with an increased thickness at the inner side. Accordingly, in this case, exposure of the aluminum layer 312 of the pouch case 300 at the inner side of the sealing portion may be prevented.

More preferably, the upper compression jig 100 and/or the lower compression jig 200 may perform the sealing process by preheating the sealing portion and applying heat and pressure together.

According to another aspect of the present disclosure, an apparatus for manufacturing a secondary battery may include the above apparatus for sealing the pouch case. In addition to the above apparatus for sealing the pouch case, the apparatus for manufacturing the secondary battery may further include an apparatus for injecting the electrolyte solution, an apparatus for cutting the pouch case, and the like.

Hereinafter, a method for sealing the pouch case according to the present disclosure will be described with reference to FIG. 10.

Figure 10:
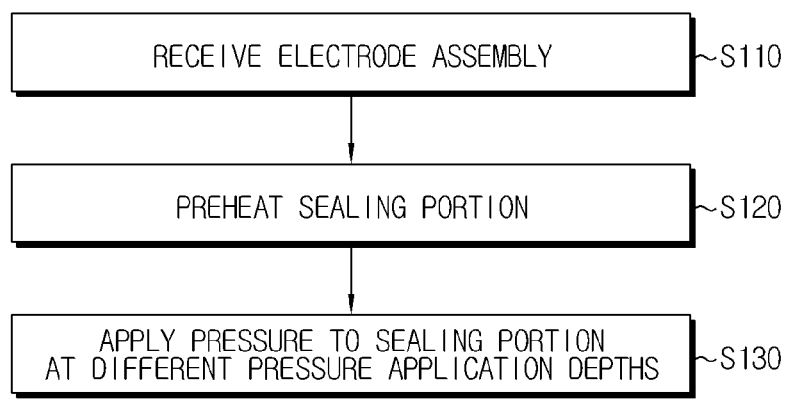
FIG. 10 is a flowchart schematically illustrating a method of sealing a pouch case according to an exemplary embodiment of the present disclosure.

FIG. 10 is a flowchart schematically illustrating the method of sealing the pouch case according to an exemplary embodiment of the present disclosure. Referring to FIG. 10, the method for sealing the pouch case includes a step of receiving the electrode assembly (S110) and a step of applying pressure to the sealing portion (S130).

The step of receiving the electrode assembly (S110) is a step of receiving the electrode assembly in the internal space 310 of the pouch case. In S110, after the electrode assembly is received in the internal space 310 of the pouch case 300, a step of injecting the electrolyte solution and a step of aligning the sealing portion of the pouch case 300 to seal the pouch case 300 may be further performed.

The step of applying pressure to the sealing portion (S130) is a step of applying pressure to the sealing portion of the aligned pouch case 300 in upward and downward directions. Particularly, in the present disclosure, the step of applying pressure to the sealing portion (S130) applies the pressure to the sealing portion of the pouch case 300 at different depths. That is, the step of applying pressure to the sealing portion (S130) applies the pressure to the sealing portion of the pouch case 300 at different depths at the inner side and the outer side of the sealing portion to the pouch case 300 so that an inner side thickness and an outer side thickness of the adhesive layer 311 of the sealing portion may differ.

The step of applying pressure to the sealing portion (S130) is preferably performed such that the pressure applying depth at the outer side of the sealing portion is greater than the pressure applying depth at the inner side of the sealing portion. By applying the pressure to the outer side of the sealing portion at a greater depth than the inner side of the sealing portion, the thick adhesive layer 311 may be formed at the inner side of the sealing portion, and thereby the insulation reliability may be ensured.

To apply the pressure to the outer side of the sealing portion at a greater depth than the inner side of the sealing portion, the above apparatus for sealing the pouch case may be used in the pressure applying step (S130).

For example, to achieve different pressure applying depths to the sealing portion, the pressure applying step (S130) may be performed in a tilting manner. The tiling may be performed by tiling the upper compression jig 100 and the lower compression jig 200 at a predetermined angle. According to this embodiment, by the tilting, the pressure applying depths at the outer side end and the inner side end to the sealing portion may differ.

More preferably, the tilting is performed by tiling the upper compression jig 100 such that the outer side portion is lower than the inner side portion and by tiling the lower compression jig 200 such that the outer side portion is higher than the inner side portion, to form the thick adhesive layer 311 at the inner side of the sealing portion.

As another example, the pressure applying step (S130) may be performed using the upper compression jig 100 and/or the lower compression jig 200 having a step in which the step is higher at the outer side end (o) than at the inner side end (i).

Preferably, the step of applying pressure to the sealing portion (S130) may apply heat to the sealing portion of the pouch case 300 together with the pressure.

Also, preferably, as shown in FIG. 10, a step of preheating the sealing portion (S120) may be further included between the step of receiving the electrode assembly (S110) and the step of applying pressure to the sealing portion (S130). The step of preheating the sealing portion (S120) is a step of preheating the sealing portion prior to applying pressure. The step of preheating the sealing portion (S120) melts the adhesive layer 311 and increases mobility, by preheating the sealing portion prior to applying pressure. When the pressure is applied to the sealing portion in the upward and downward directions in a state that the adhesive layer 311 is sufficiently melted, the adhesive layer 311 is forced to move to the both sides at a proper rate. Accordingly, the adhesive layer 311 is not forced to move out of the sealing portion more than necessary so that the thick adhesive layer 311 may be secured at the inner side of the sealing portion.

More preferably, the preheating step (S120) may be further included before the pressure applying step (S130), and the pressure applying step (S130) may apply heat to the sealing portion together with pressure.

Certain features which are described in this specification in the context of separate embodiments can also be implemented in combination in a single embodiment. Conversely, various features described in the context of a single embodiment can also be implemented in multiple embodiments separately or in any suitable subcombination.

In the above detailed description or the drawings of the present disclosure, the terms such as upper, lower, inner, and outer are used to relatively distinguish one element from the other element, and they are just an instrumental concept for improving the efficiency of description and should not be interpreted as a concept used for determining a physical location, a context, and the like, by absolute standards.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An apparatus for sealing a pouch case of a pouch-type secondary battery, the apparatus comprising:
   an upper compression jig having a pressure applying surface to apply pressure to a sealing portion of the pouch case in a downward direction; and
   a lower compression jig having a pressure applying surface to apply pressure to the sealing portion of the pouch case in an upward direction,
   wherein the pressure applying surfaces of the upper and lower compression jigs each extend from a respective inner side end to a respective outer side end, the inner side end being positioned closer than the outer side end to an electrode assembly received in an internal space of the pouch case when the upper and lower compression jigs apply pressure to the sealing portion of the pouch case, and wherein at least one of the upper compression jig and the lower compression jig is configured such that its respective pressure applying surface applies pressure to the sealing portion of the pouch case at a different depth at the inner side end than at the outer side end.

2. The apparatus according to claim 1, wherein at least one of the upper compression jig and the lower compression jig tilts in contact with the pouch case.

3. The apparatus according to claim 2, wherein the tilting is performed in a manner of applying a higher pressure to the pouch case at the outer side end of at least one of the upper compression jig and the lower compression jig.

4. The apparatus according to claim 1, wherein at least one of the upper compression jig and the lower compression jig has a step formed on its respective pressure applying surface.

5. The apparatus according to claim 4, wherein the step is formed higher at the outer side end than at the inner side end.

6. The apparatus according to claim 4, wherein a number of the steps is at least two.

7. The apparatus according to claim 1, wherein at least one of the upper compression jig and the lower compression jig has a slope over the pressure applying surface.

8. The apparatus according to claim 7, wherein the slope is formed higher at the outer side end of at least one of the upper compression jig and the lower compression jig than at the inner side end.

9. The apparatus according to claim 1, wherein at least one of the upper compression jig and the lower compression jig applies heat to the sealing portion of the pouch case with the pressure.

10. The apparatus according to claim 1, wherein at least one of the upper compression jig and the lower compression jig preheats the sealing portion of the pouch case before applying the pressure.

11. An apparatus for manufacturing a secondary battery comprising the apparatus for sealing the pouch case defined in claim 1.

\* \* \* \* \*